(12) United States Patent
Nakajima

(10) Patent No.: US 11,543,144 B2
(45) Date of Patent: Jan. 3, 2023

(54) UPDATING BOOT PROGRAM OF AN AIR CONDITIONING CONTROL APPARATUS

(71) Applicant: DENSO WAVE INCORPORATED, Aichi-pref. (JP)

(72) Inventor: Kensuke Nakajima, Chita-gun (JP)

(73) Assignee: DENSO WAVE INCORPORATED, Aichi-Pref. (JP)

( * ) Notice: Subject to any disclaimer, the term of this patent is extended or adjusted under 35 U.S.C. 154(b) by 162 days.

(21) Appl. No.: 17/022,161

(22) Filed: Sep. 16, 2020

(65) Prior Publication Data

US 2021/0095877 A1 Apr. 1, 2021

(30) Foreign Application Priority Data

Sep. 27, 2019 (JP) .............................. JP2019-177064

(51) Int. Cl.
*F24F 11/48* (2018.01)
*G06F 8/654* (2018.01)
*G06F 9/4401* (2018.01)

(52) U.S. Cl.
CPC .............. *F24F 11/48* (2018.01); *G06F 8/654* (2018.02); *G06F 9/4401* (2013.01)

(58) Field of Classification Search
CPC ........ F24F 11/48; G06F 8/654; G06F 9/4401; Y02D 10/00
USPC ................................................ 700/275–285
See application file for complete search history.

(56) References Cited

U.S. PATENT DOCUMENTS

| 9,740,385 | B2* | 8/2017 | Fadell | G01J 5/0025 |
| 9,851,728 | B2* | 12/2017 | Matsuoka | G05D 23/1919 |
| 2003/0191955 | A1* | 10/2003 | Wagner | G06F 21/572 |
| | | | | 713/191 |
| 2010/0088503 | A1* | 4/2010 | Eto | G06F 1/30 |
| | | | | 713/100 |
| 2010/0106957 | A1* | 4/2010 | Grohman | G06F 8/654 |
| | | | | 711/E12.091 |
| 2012/0191255 | A1* | 7/2012 | Han | F24F 11/30 |
| | | | | 714/E11.023 |
| 2017/0038087 | A1* | 2/2017 | Nabeshima | F24F 1/0047 |
| 2017/0099518 | A1* | 4/2017 | Hsueh | H02J 13/00 |
| 2018/0246831 | A1* | 8/2018 | Moeller | G06F 13/385 |

OTHER PUBLICATIONS

Arnold, Jeff, and M. Frans Kaashoek. "Ksplice: Automatic rebootless kernel updates." Proceedings of the 4th ACM European conference on Computer systems. 2009.pp. 187-198 (Year: 2009).*

(Continued)

*Primary Examiner* — Satish Rampuria
(74) *Attorney, Agent, or Firm* — Harness, Dickey & Pierce, P.L.C.

(57) ABSTRACT

An air conditioning control apparatus includes a memory interface performing a data transceiving between a storage medium, a memory, and a controller. The storage medium stores a boot program in a boot program region. The memory stores the boot program of the storage medium. The controller reads out the boot program of the storage medium from the memory when a predetermined period is elapsed, and overwrites the boot program that is read out in the boot program region of the storage medium.

4 Claims, 5 Drawing Sheets

(56) References Cited

OTHER PUBLICATIONS

Hicks, Michael, Jonathan T. Moore, and Scott Nettles. "Dynamic software updating." ACM SIGPLAN Notices 36.5 (2001): pp. 13-23. (Year: 2001).*

Neamtiu, Iulian, and Tudor Dumitraş. "Cloud software upgrades: Challenges and opportunities." 2011 International Workshop on the Maintenance and Evolution of Service-Oriented and Cloud-Based Systems. IEEE, 2011.pp. 1-10 (Year: 2011).*

Akritidis, Periklis, et al. "Preventing memory error exploits with WIT." 2008 IEEE Symposium on Security and Privacy (sp 2008). IEEE, 2008.pp.263-277 (Year: 2008).*

Baek, Seungjae, Sangyeun Cho, and Rami Melhem. "Refresh now and then." IEEE Transactions on Computers 63.12 (2013): pp. 3114-3126. (Year: 2013).*

Jung, Ju-Young, and Sangyeun Cho. "Memorage: Emerging persistent RAM based malleable main memory and storage architecture." Proceedings of the 27th international ACM conference on International conference on supercomputing. 2013. pp. 115-126 (Year: 2013).*

* cited by examiner

UPDATING BOOT PROGRAM OF AN AIR CONDITIONING CONTROL APPARATUS

CROSS REFERENCE TO RELATED APPLICATION

The present application claims the benefit of priority from Japanese Patent Application No, 2019-177064 filed on Sep. 27, 2019. The entire disclosure of the above application is incorporated herein by reference.

TECHNICAL FIELD

The present disclosure relates to an air conditioning control apparatus.

BACKGROUND

There has been known an air conditioning control apparatus which stores an application program in a storage medium, such as a micro secure digital (SD) card.

SUMMARY

An air conditioning control apparatus includes a memory interface performing a data transceiving between a storage medium, a memory, and a controller. The storage medium stores a boot program in a boot program region. The memory stores the boot program of the storage medium. The controller reads out the boot program of the storage medium from the memory when a predetermined period is elapsed, and overwrites the boot program that is read out in the boot program region of the storage medium.

BRIEF DESCRIPTION OF DRAWINGS

Objects, features and advantages of the present disclosure will become apparent from the following detailed description made with reference to the accompanying drawings. In the drawings.

DETAILED DESCRIPTION

Figure 1:
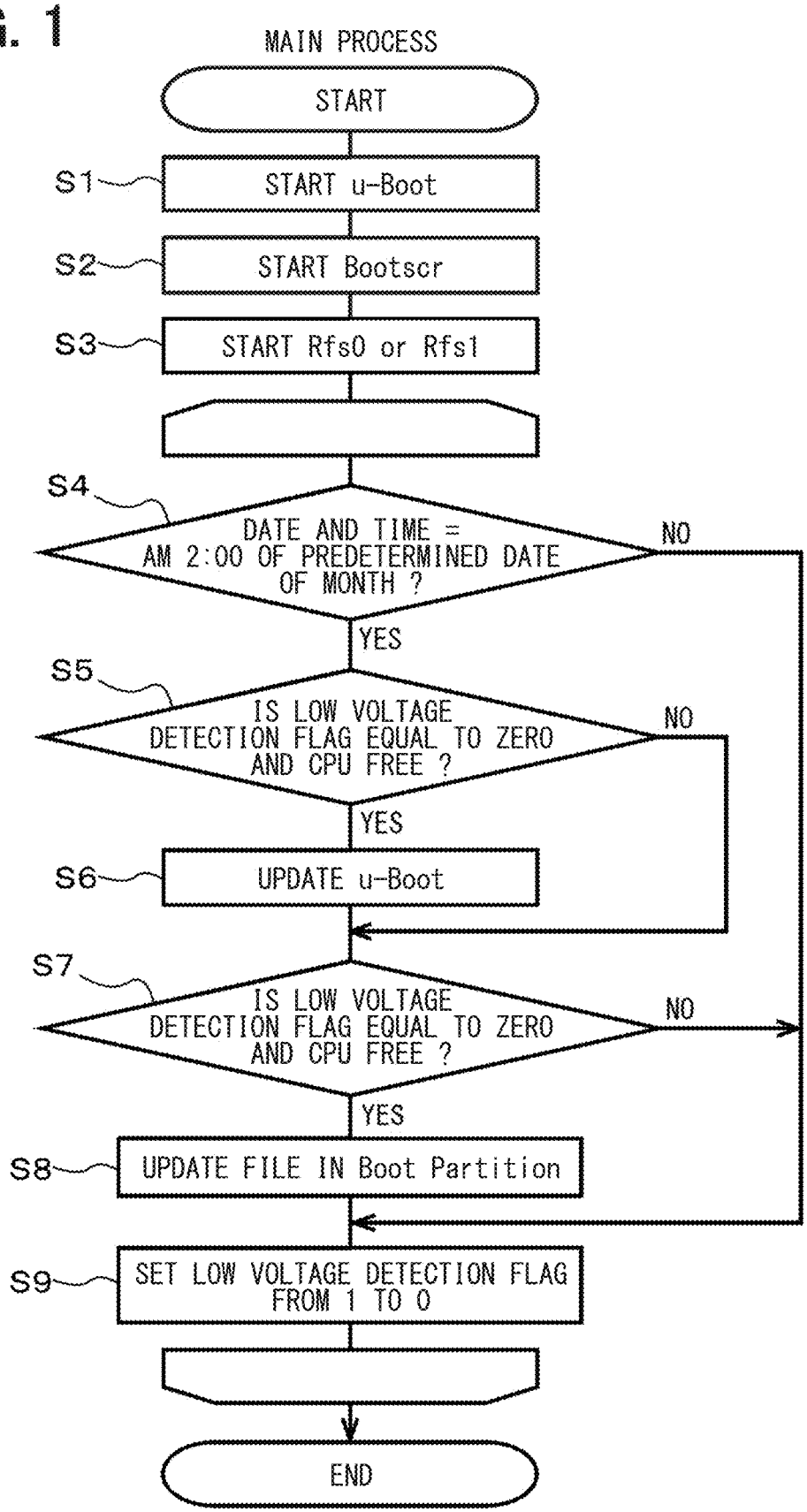
FIG. 1 is a flowchart showing a main process executed by an air conditioning control apparatus according to an embodiment of the present disclosure.

In some air conditioning control apparatus, an application program of the air conditioning control apparatus is stored in a storage medium, such as a micro secure digital (SD) card. When a version of the application program of the air conditioning control apparatus is updated, the application program is read out from the micro SD card and updated, and this configuration is made for easy update of the application program. The micro SD is a registered trademark.

The micro SD card may have a configuration in which a data value is represented by multiple bits. When the data value is represented by multiple bits, a threshold width of a voltage that divides the data value becomes narrower, and data corruption or bit error is likely to occur. When using the micro SD card, it is necessary to store a boot program of the micro SD card in a boot program region of the micro SD card. When a corruption of the boot program occurs, the micro SD card cannot be used.

According to an aspect of the present disclosure, an air conditioning control apparatus includes a memory interface, a memory, and a controller. The memory interface performs a data transceiving between a storage medium. The storage medium stores an application program. The air conditioning control apparatus is configured to read out and update the application program stored in the storage medium. The storage medium includes a boot program region in which a boot program of the storage medium is stored. The memory stores the boot program of the storage medium. The controller reads out the boot program of the storage medium from the memory when a predetermined period is elapsed, and overwrites the boot program that is read out in the boot program region of the storage medium. With this configuration, the boot program stored in the storage medium is overwritten and refreshed at every predetermined period. Thus, it is possible to prevent an occurrence of a bit error in the boot program region of the storage medium.

The storage medium may be provided by a micro SD card. Thus, the present disclosure can be applied to a case where the widely used micro SD card is used as the storage medium which includes the boot program region.

The air conditioning control apparatus may further include a low voltage detector that sets a low voltage detection flag when a power supply voltage decreases to be lower than a predetermined threshold voltage. The controller may overwrite the boot program under a condition that the low voltage detection flag is reset. When the overwriting of the boot program in the boot program region of the storage medium is executed in a state where the power supply voltage is in a decreased state, the overwriting may be interrupted without completion. When the overwriting is executed under a condition that the low voltage detection flag is reset, the overwriting can be reliably completed without interruption.

The air conditioning control apparatus may further include a processing load determiner that sets a busy flag when determining that a processing load of the controller exceeds a predetermined level. The controller may overwrite the boot program under a condition that the busy flag is reset. When the overwriting of the boot program in the boot program region of the storage medium is executed in a state where the processing load of the controller exceeds the predetermined level, a necessary period for the overwriting may be increased. Thus, the overwriting may be interrupted without completion during the increased period due to a drop of the power supply voltage. When the overwriting is executed under a condition that the busy flag is reset, the overwriting can be completed without interruption due to the drop of the power supply voltage. Herein, the drop of the power supply voltage may be caused by a power supply interruption. With this configuration, the overwriting can be reliably completed without interruption.

Figure 3:
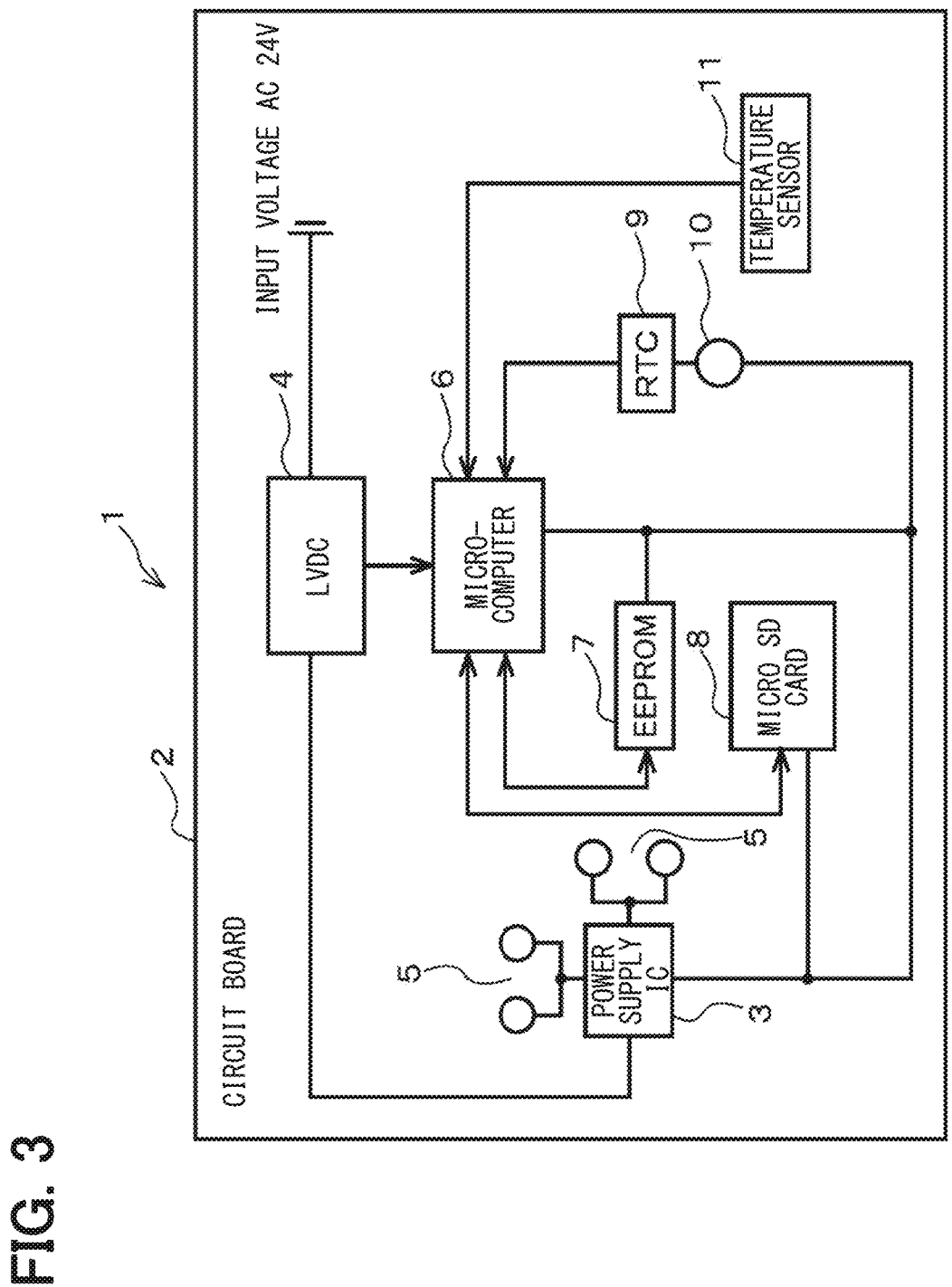
FIG. 3 is a diagram showing an electrical configuration of the air conditioning control apparatus.

Hereinafter, an embodiment of the present disclosure will be described with reference to the drawings. As shown in FIG. 3, an alternating current (AC) power supply of, for example, 24 volts is supplied to a circuit board 2 which configures an air conditioning control apparatus 1 according to the present embodiment. The circuit board 2 includes multiple electrolytic capacitors 5, a power supply integrated circuit (IC) 3, a low voltage detection circuit (LVDC) 4, a microcomputer 6, an electrically erasable programmable read-only memory (EEPROM) 7, a micro SD card 8, a real time clock (RTC) 9, a super capacitor 10, and a temperature sensor 11. The multiple electrolytic capacitors 5 are arranged close to the power supply IC 3, and the power supply IC 3 is supplied with a direct current (DC) voltage of, for example, 24 volts. The DC voltage supplied to the power supply IC 3 is generated by the electrolytic capacitor 5 by smoothing the AC voltage via a rectifier circuit (not shown). The power supply IC 3 generates a power voltage of, for example, 3.3 volts, and supplies the power voltage to the microcomputer 6, the EEPROM 7, the micro SD card 8, the RTC 9, or the like. The micro SD card 8 is provided as an example of a storage medium. The power voltage is supplied to the RTC 9 through the super capacitor 10. The RTC 9 keeps a track of the current time and date.

Figure 2:
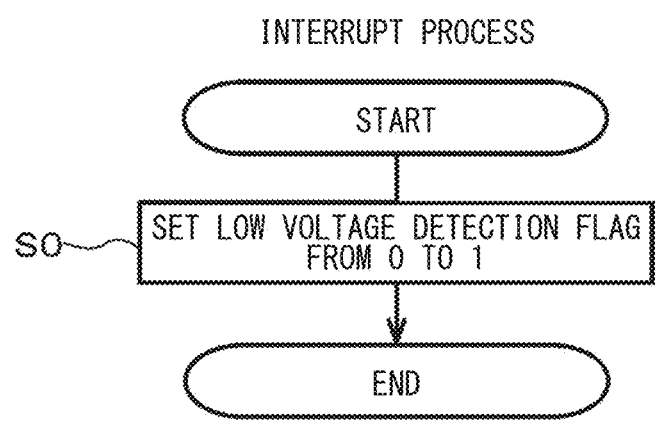
FIG. 2 is a flowchart showing an interrupt process executed by a microcomputer.

The microcomputer 6, the EEPROM 7, the micro SD card 8, and the RTC 9 are connected via a bus. The microcomputer 6 corresponds to a controller, and the EEPROM 7 corresponds to a memory. The temperature sensor 11 detects an inside temperature of a room where the air conditioning control apparatus 1 is arranged, and outputs the detection result to the microcomputer 6. When the low voltage detection circuit 4 detects that a terminal voltage of the electrolytic capacitor 5 decreases to a predetermined threshold voltage of, for example, 10 volts, the low voltage detection circuit 4 outputs a detection signal to the microcomputer 6 as an interrupt. In response to the received detection signal from the low voltage detection circuit 4, the microcomputer 6 sets a low voltage detection flag from "0" to "1" as shown in S0 of FIG. 2, The low voltage detection circuit 4 and the microcomputer 6 correspond to an example of a low voltage detector. The microcomputer 6 and the micro SD card 8 are electrically connected via a memory interface, the detailed illustration of the memory interface is omitted.

Figure 4:
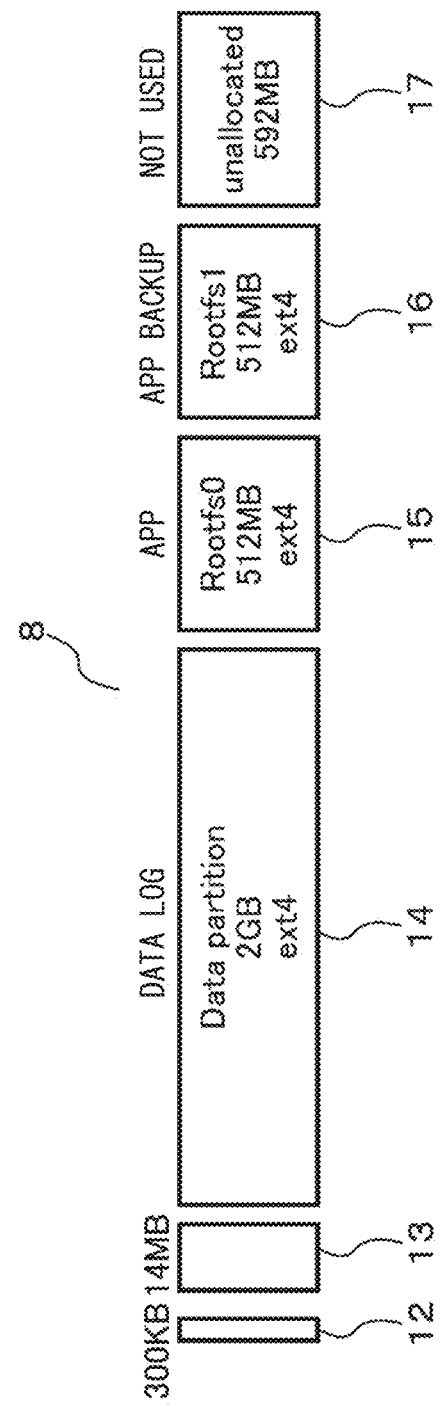
FIG. 4 is a diagram showing an example of a partition configuration of a micro secure digital (SD) card.

FIG. 4 shows a partition configuration of the micro SD card 8. As shown in FIG. 4, a storage region of the micro SD card 8 is divided into u-Boot 12, Boot partition 13, Data partition 14, Rootfs0 15, Rootfs1 16, and an unallocated region 17. For example, a data capacity and usage of each partition may be set as follows. In the following description, "p." indicates an abbreviation of partition.

| Partition | Capacity | Usage (stored contents) |
|---|---|---|
| u-Boot | 300 kB | program for booting an operating system (OS) in the micro SD card |
| Boot p. | 14 MB | program including setting information of startup |
| Data p. | 2 GB | data log or the like |
| Rootfs0 | 512 MB | application program |
| Rootfs1 | 512 MB | backup of the application program |
| unallocated | 592 MB | not used |

At the time of shipment, a boot program is stored in the u-Boot 12 and the Boot p. 13. After the shipment, the u-Boot 12 and the Boot p. 13 are used as a read only memory. Therefore, when the air conditioning control apparatus 1 is operated, writing is allowed in only the Data p. 14, the Rootfs0 15, and the Rootfs1 16. In the present embodiment, the boot program is also stored, in advance, in the EEPROM 7, and the u-Boot 12 and the Boot p. 13 are configured to be writable, by the microcomputer 6, when a predetermined condition is satisfied.

The following will describe an operation of the air conditioning control apparatus 1 according to the present embodiment. FIG. 1 is a flowchart showing a main process executed by the air conditioning control apparatus 1. First, the microcomputer 6 starts and executes the boot program stored in the u-Boot 12 and the Boot p. 13 of the micro SD card 8 in S1 and S2. Then, the microcomputer 6 executes an application program stored in the Rootfs0 15 in S3. In S3, an application program stored in the Rootfs1 16 may be executed instead of executing the application program stored in the Rootfs0 15.

In S4, the microcomputer 6 determines whether a current time is equal to AM 2:00 of a predetermined date of a predetermined month with reference to the current time tracked in the RTC 9. When the current time is not equal to the AM 2:00 of the predetermined date of the predetermined month (S4: NO), the microcomputer 6 clears the low voltage detection flag to zero in S9, and returns to S4.

When the current time is equal to the AM 2:00 of the predetermined date of the predetermined month (S4: YES), the microcomputer 6 determines, in S5, whether the low voltage detection flag is equal to zero and further determines whether a state of the microcomputer 6 is free in which a central processing unit (CPU) of the microcomputer 6 has a low processing load. For example, when the microcomputer 6 performs a communication process with an air conditioning device, which is not shown in FIG. 1, the processing load of the CPU in the microcomputer 6 may be high. For example, when the processing load of the CPU is high, that is, the processing load exceeds a predetermined level, a busy flag of the microcomputer 6 may be set to one. When the processing load of the CPU is low, that is, the processing load is equal to or lower than the predetermined level, the busy flag of the microcomputer 6 may be set to zero. A state where the busy flag is set to zero corresponds to the free state of the microcomputer 6. The determination in S5 may be executed by a logic circuit included in the microcomputer 6. The logic circuit may be the CPU or a peripheral circuit of the CPU of the microcomputer 6. In the present embodiment, the CPU corresponds to an example of a processing load determiner.

When the microcomputer 6 determines, in S5, that the low voltage detection flag is equal to zero and the state of the microcomputer 6 is free (S5: YES), the microcomputer 6 overwrites the boot program in the u-Boot 12 of the micro SD card 8 in S6. Specifically, the microcomputer 6 reads out the boot program stored in the EEPROM 7, and overwrites the read out boot program in the u-Boot 12 of the micro SD card 8, When the microcomputer 6 determines NO in S5, the process proceeds to ST In S7, the microcomputer 6 determines again whether the low voltage detection flag is equal to zero and the state of the microcomputer 6 is free, similar to S5. When the microcomputer 6 determines YES in S7, the microcomputer 6 overwrites the read out boot program in the Boot p. 13 of the micro SD card 8 in S8. When the microcomputer 6 determines NO in S7, the process proceeds to S9.

In the above-described process, when the current time is equal to AM 2:00 of predetermined date of month of each year and YES is determined in S5 or S7, the boot program is overwritten in each of the u-Boot 12 and the Boot p. 13 of the micro SD card 8. In the present embodiment, the predetermined period is set to one year as an example.

Figure 5:
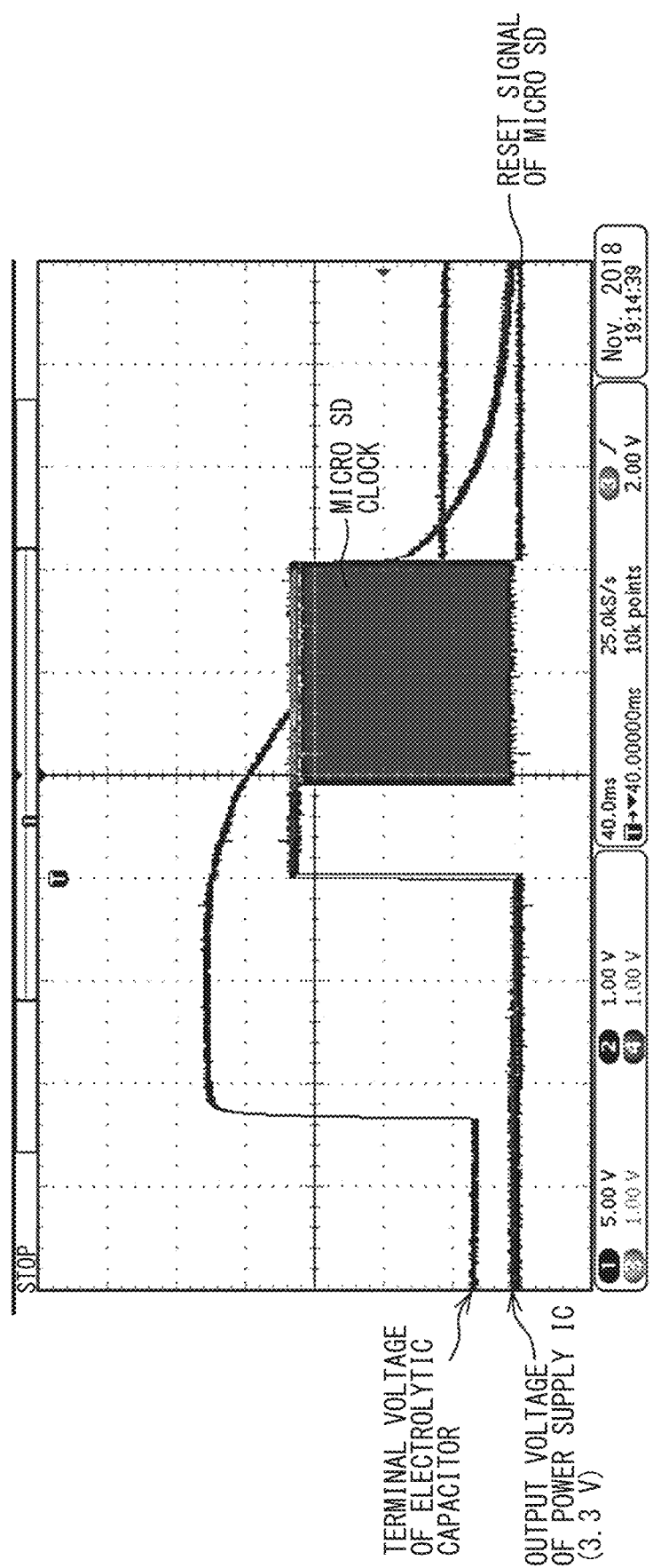
FIG. 5 is a diagram showing waveforms of a terminal voltage of an electrolytic capacitor, an output voltage of a power supply IC, a reset signal of the micro SD card, and a clock signal of the micro SD card.

FIG. 5 is a diagram showing waveforms of a terminal voltage of the electrolytic capacitor 5, an output voltage of the power supply IC 3, a reset signal of the micro SD card 8, and a clock signal of the micro SD card 8. For example, a frequency of the clock signal is set to 528 megahertz (MHz). For example, a capacitance of the electrolytic capacitor 5 is set to 400 µF, an overwrite period of the u-Boot 12 is set to 46 milliseconds, an overwrite period of the Boot p. 13 is set to 73 milliseconds, Thus, an overwrite period of the u-Boot 12 and the Boot p. 13 is about 120 milliseconds in total. A current consumption during the overwriting period is about 120 mA.

The AC voltage of 24 volts is applied to the electrolytic capacitor 5 for 1 millisecond, and then the AC voltage is cut off. The voltage of 24 volts is maintained for a while by the capacity of the electrolytic capacitor 5. About 90 milliseconds after the power is turned on by applying the AC voltage to the electrolytic capacitor 5, the power supply IC 3 starts to output a power voltage of 3.3 volts, A power-on reset of the micro SD card 8 is released in response to the supply of power voltage by the power supply IC 3. After an elapse of 40 milliseconds from the supply of power voltage by the power supply IC 3, a clock circuit (not shown) provided for the micro SD card 8 starts to operate, After operating for about 80 milliseconds, the micro SD card 8 is reset and the operation of the micro SD card 8 is stopped due to a voltage drop in the 3.3 volts power voltage supplied by the power supply IC 3.

In the case shown in FIG. 5, the capacity of the electrolytic capacitor 5 is set to 400 µF. Thus, a period of 200 milliseconds is secured from an interruption of the power supply to the operation stop of the micro SD card 8. Thus, the secured period from the power supply interruption to the operation stop of micro SD card 8 is possible to cover 120 milliseconds, which is the total period required for overwriting the u-Boot 12 and the Boot p. 13. The predetermined threshold voltage of the low voltage detection circuit 4 is set to 10 volts. When the low voltage detection flag is set, that is the flag is set to one, it becomes difficult to maintain the 3.3 volts of the power supply voltage during the above-described total period or longer. Thus, in the determination of S5 and S7, the low voltage detection flag of zero, that is, the reset of the low voltage detection flag is used as a determination condition.

Suppose that the overwriting is performed while the processing load of the CPU is high. In this case, when the power is cut off, the overwriting is interrupted, and cannot be completed within the period while 3.3 volts of power supply voltage is maintained. This may cause the micro SD card 8 becomes to be unusable. Therefore, in the determination of S5 and S7, the free state of the CPU, that is the reset of the busy flag is used as a condition in addition to the low voltage detection flag.

As described above, in the present embodiment, the air conditioning control apparatus 1 includes a memory interface that transmits and receives data to and from the micro SD card 8. A version update of the application program stored in the micro SD card 8 can be easily executed by reading out the application program stored in the micro SD card 8 via the memory interface. The EEPROM 7 stores, in advance, the boot program which is to be written into the boot program region, u-Boot 12, Boot p. 13 of the micro SD card 8. When the predetermined period is elapsed, the microcomputer 6 reads out the boot program from the EEPROM 7, and overwrites the readout boot program in the u-Boot 12 and the Boot p. 13 of the micro SD card 8, With this configuration, the boot program stored in the micro SD card 8 is overwritten and refreshed at every predetermined period. Thus, it is possible to prevent an occurrence of a bit error in the boot program stored in the boot program region of the micro SD card 8.

The microcomputer 6 overwrites the boot program in the u-Boot 12 and the Boot p. 13 of the micro SD card 8 under a condition that the low voltage detection flag is reset, that is, the flag is set to zero. The low voltage detection flag is set to one when the terminal voltage of the electrolytic capacitor 5 decreases to a voltage lower than the predetermined threshold voltage. With this configuration, the overwriting can be completed while the 3.3 volts of the power supply voltage is reliably maintained.

The microcomputer 6 overwrites the boot program in the u-Boot 12 and the Boot p. 13 of the micro SD card 8 under a condition that the busy flag of the CPU is reset. The busy flag of the CPU is reset when the processing load of the CPU is low. This configuration can suppress an interruption of the overwriting due to a drop of the power supply voltage from 3.3 volts, and secures a reliable completion of the overwriting.

The present disclosure is not limited only to the embodiment described above or shown in the drawings, and may be modified or expanded as follows. In the above embodiment, the size of each partition of the micro SD card, the parameters of the voltages and the circuits, time, periods are described as an example. These parameters or settings may be changed appropriately. The predetermined period is not limited to one year, and may be set appropriately to a different period. The determinations in S5 and S7 may be carried out when only the low voltage detection flag is reset without the condition of the CPU processing load. The storage medium is not limited to the micro SD card. The present disclosure can be applied to any storage medium including a boot program region in which a boot program is stored. In the present disclosure, the memory and the storage medium each is a tangible non-transitory computer-readable medium.

What is claimed is:

1. An air conditioning control apparatus comprising:
   a memory interface performing a data transceiving between a storage medium and the air conditioning control apparatus, the storage medium storing an application program, the air conditioning control apparatus being configured to read out and update the application program stored in the storage medium, and the storage medium including a boot program region in which a boot program of the storage medium is stored;
   a memory storing the boot program of the storage medium; and
   a controller periodically reading out the boot program of the storage medium from the memory when a predetermined period is elapsed from a last readout of the boot program from the memory and overwriting the boot program that is read out in the boot program region of the storage medium although the boot program currently stored in the storage medium has no bit error.

2. The air conditioning control apparatus according to claim 1, wherein
   the storage medium is a micro secure digital card.

3. The air conditioning control apparatus according to claim 1, further comprising
   a low voltage detector that sets a low voltage detection flag when a power supply voltage decreases to be lower than a predetermined threshold voltage,
   wherein the controller overwrites the boot program under a condition that the low voltage detection flag is reset.

4. The air conditioning control apparatus according to claim 3, further comprising
   a processing load determiner that sets a busy flag when determining that a processing load of the controller exceeds a predetermined level, wherein the controller overwrites the boot program under a condition that the busy flag is reset.

* * * * *